(No Model.)

F. C. DURANT.
FOOT REST AND CLAMP FOR BICYCLES.

No. 567,967. Patented Sept. 22, 1896.

WITNESSES:
James H. Bell
G. Herbert Jenkins

INVENTOR:
Frederick C. Durant,
By H. C. Riley,
Attorney.

THE NORRIS PETERS CO., PHOTO-LITHO., WASHINGTON, D. C.

UNITED STATES PATENT OFFICE.

FREDERICK C. DURANT, OF NEW YORK, N. Y., ASSIGNOR TO ARTHUR H. LEA, OF PHILADELPHIA, PENNSYLVANIA.

FOOT-REST AND CLAMP FOR BICYCLES.

SPECIFICATION forming part of Letters Patent No. 567,967, dated September 22, 1896.

Application filed July 17, 1895. Serial No. 556,301. (No model.)

*To all whom it may concern:*

Be it known that I, FREDERICK C. DURANT, of New York, in the State of New York, have invented a certain new and useful Improved Foot-Rest and Clamp for Bicycles, whereof the following is a specification, reference being had to the accompanying drawings.

The object of my invention is to so construct an ordinary part of a bicycle that it may not only serve its normal purpose when in one position, but be susceptible of use as a repairing device in certain cases of breakage.

One of the most annoying accidents which can happen to a bicycle is the splitting or cracking of the rim, to which the rubber tire is attached. The machine is practically rendered useless by a serious fracture of this character, and there is no ordinary way of repairing it short of renewal of the rim itself.

The object of my invention is to provide means whereby, without adding to the weight of the outfit, an ordinary appliance of the bicycle itself may be employed as a temporary remedy for such fractures, so that the rider shall be able to continue his journey until a point where a permanent repair or renewal can be effected. To this end I so construct the foot-rests, which are used for coasting, and so combine them with their supports, as that they may be removed and utilized as clamps at any desired point upon the rim.

Figure 1:
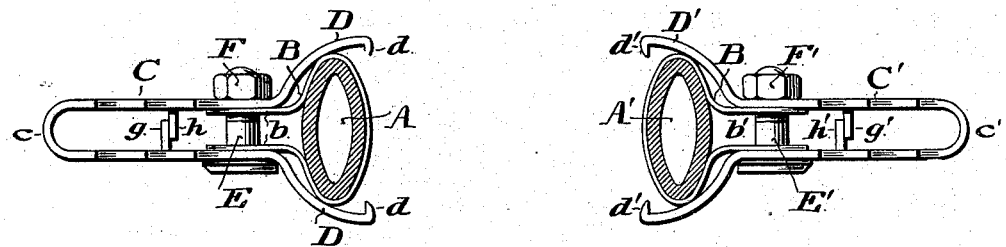
Figure 6:
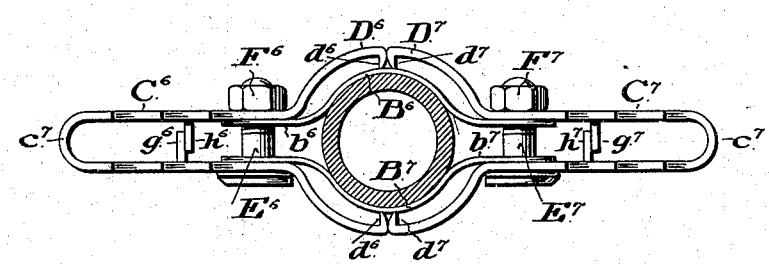
Figure 5:
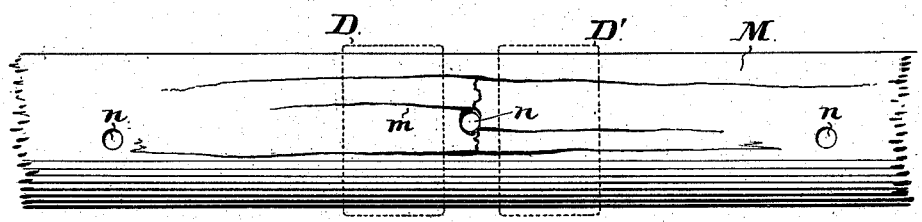
Figure 2:
Figure 4:
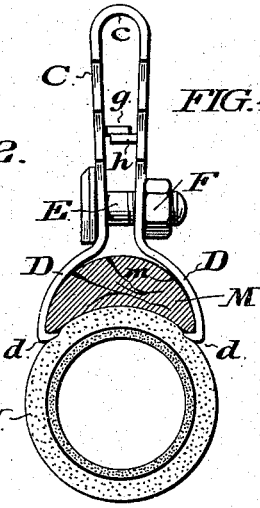
Figure 3:
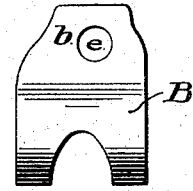

In the accompanying drawings, Figure 1 represents a top or plan view of a pair of foot-rests attached in this instance to the forked portion of the upright or stem which carries the front wheel of the bicycle, the two forks of said stem being represented in transverse section. Fig. 2 is a side view of one foot-rest. Fig. 3 is a side view of the interior band which I employ to hold it in position when serving as a foot-rest. Fig. 4 is a top or plan view of the foot-rest when employed as a clamp in case of accident, the rim and adjacent rubber tire being shown in transverse section. Fig. 5 is a plan view of a split rim, showing the method of applying a pair of clamps thereto on each side of the principal fracture. Fig. 6 is a view of a pair of foot-rest clamps, showing the method of their application to the front stem or upright of the bicycle instead of to the bifurcations thereof, this method of mounting the foot-rest being preferred by some riders.

Referring to the type shown in Fig. 1, A A' represent the bifurcations of the front stem, to which the right and left foot-rests are respectively attached. As the construction of both members of the pair is the same, except that they are rights and lefts, I will only proceed to describe in detail the left-hand one shown in the figure, the corresponding parts of the other one being indicated by similar letters with the prime-mark.

The stem A, which is of elongated oval cross-section, is embraced by a close-fitting metal band B, (see also Fig. 3,) whose ends *b* are prolonged outward parallel to one another for some distance, holes *e* being formed near the outer end of said prolongations. For convenience of nomenclature I term this device the "holding-band."

The foot-rest C consists of a continuous strip of metal serrated upon its upper edge and bent at *c*, so as to form two parallel faces. The end portions of the strip are outwardly bowed, as indicated at D D, so as to partly embrace the stem A and its holding-band B, the extremities of the strip being turned sharply inward, so as to form a pair of inwardly-projecting engaging flanges or lips *d d*.

As is usual in foot-rests formed of metal strips, a pair of lugs *g h* are struck inward, slightly overlapping and bearing against one another, so as to strengthen the foot-rest. A transverse bolt E, provided with a nut F, extends across through holes formed in the two side pieces of the foot-rest and also through the holes *e* of the holding-band. By means of this bolt and nut the holding-band is clamped tightly around the stem A, and the foot-rest is clamped against the holding-band, so as to maintain the whole structure firmly in position when used as a foot-rest.

Referring now to Figs. 4 and 5, M indicates the rim of the bicycle-wheel, usually of wood, and N the rubber tire applied thereto, *n* indicating the points of insertion of the spokes.

Let it be supposed that a ragged fracture, as *m*, has occurred in this rim. The foot-rests are removed by unscrewing the nuts F F', the holding-bands B B being allowed in this instance to remain in place, if desired, and one or both the foot-rest clamps may be then applied at the best location adjacent to the fracture by inserting the lips $d\ d$ beneath the edges of the rim, (the rubber tire yielding sufficiently to admit them,) and the bolt E being again inserted the nut F is screwed up until the bowed portions D D are tightly pressed against the rim M, thus holding the cracked or fractured parts together.

Where the fracture is a serious one, as indicated in Fig. 5, it is desirable to apply both clamps on opposite sides of the worst point of fracture, and a strengthening-strip, of wood or other material, like a splint, may be inserted between the face of the rim and the clamps, so as to obtain additional strength.

In Fig. 6 the construction of the foot-rests is similar to that shown in Fig. 1, but as they are to be applied to a single stem, instead of to the bifurcated one of the other figure, I prefer to construct the holding-band in two parts, as indicated at $B^6\ B^7$, each of said parts being bowed outwardly to embrace a portion of the periphery of the stem, and the elongated straight ends of the holding-band extending into a position on either side adapted to receive the bolt which secures the foot-rest on that side. Obviously, however, the construction of the holding-band in two parts, instead of one, does not in any way affect its function, and in my claim, hereinafter made, I ignore this detail of construction.

I am of course aware that the use of bicycle foot rests or steps is not new, and that it has been common to secure such devices to the frame of the bicycle by means of bands provided with bolts and nuts. I make no claim, broadly, thereto; but the devices heretofore in use, so far as I am aware, were incapable of application in the manner and for the purposes which characterize my improvement.

Having thus described my invention, I claim—

The combination, with the bicycle-stem, of a band-clamp adapted to embrace said stem, and having an outwardly-projecting extension, substantially as set forth; a foot-rest clamp adapted to embrace said outward extension of the holding-band, and having bowed end portions provided with inwardly-projecting lips; and means, substantially as set forth, whereby said foot-rest clamp may be secured in either of its alternate positions, substantially as and for the purposes specified.

FREDERICK C. DURANT.

Witnesses:
   G. HUBERT JENKINS,
   JAMES H. BELL.